United States Patent
Fujie et al.

(10) Patent No.: US 9,885,273 B2
(45) Date of Patent: Feb. 6, 2018

(54) DIAGNOSTIC DEVICE FOR AN OXIDATION CATALYST

(71) Applicant: ISUZU MOTORS LIMITED, Tokyo (JP)

(72) Inventors: Hidekazu Fujie, Yamato (JP); Tadashi Uchiyama, Kamakura (JP); Satoshi Hanawa, Fujisawa (JP); Naoto Murasawa, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 209 days.

(21) Appl. No.: 15/022,331

(22) PCT Filed: Sep. 18, 2014

(86) PCT No.: PCT/JP2014/074688
§ 371 (c)(1),
(2) Date: Mar. 16, 2016

(87) PCT Pub. No.: WO2015/041290
PCT Pub. Date: Mar. 26, 2015

(65) Prior Publication Data
US 2016/0230635 A1  Aug. 11, 2016

(30) Foreign Application Priority Data

Sep. 18, 2013 (JP) .................................. 2013-193012

(51) Int. Cl.
*G01M 15/10* (2006.01)
*F01N 11/00* (2006.01)
(Continued)

(52) U.S. Cl.
CPC .......... *F01N 11/00* (2013.01); *B01D 53/9477* (2013.01); *B01D 53/9495* (2013.01);
(Continued)

(58) Field of Classification Search
USPC ....................................... 73/114.75
See application file for complete search history.

(56) References Cited

U.S. PATENT DOCUMENTS 9,759,107 B2 * 9/2017 Uchiyama ............. F01N 3/0253
2016/0222861 A1 * 8/2016 Fujie ....................... F01N 3/103
2016/0245141 A1 * 8/2016 Uchiyama ............... F01N 3/106

FOREIGN PATENT DOCUMENTS

JP          2012-36860         2/2012

OTHER PUBLICATIONS

Japan Platform for Patent Information, English Abstract of Japanese Publication No. 2012-36860 published Feb. 23, 2012.
(Continued)

*Primary Examiner* — Eric S McCall
(74) *Attorney, Agent, or Firm* — Staas & Halsey LLP

(57) ABSTRACT

A diagnostic device includes: a diesel oxidation catalyst (DOC) for oxidizing hydrocarbon (HC) and nitrogen monoxide in an exhaust gas; a selective catalytic reduction (SCR) catalyst for reducing and purifying NOx contained in the exhaust gas; a NOx purification rate calculation unit which calculates, based on NOx values at upstream and downstream sides of the SCR catalyst, a low temperature NOx purification rate and a high temperature NOx purification rate; a HC heat generation rate calculation unit which calculates an HC purification rate based on at least the difference between the exhaust gas heat quantities at upstream and downstream sides of the DOC; and a deterioration determination unit which determines the deterioration in the $NO_2$ producing capability of the DOC based on the calculated low temperature NOx purification rate, the calculated high temperature NOx purification rate, and the calculated HC purification rate.

10 Claims, 6 Drawing Sheets

(51) Int. Cl.
*F01N 3/10* (2006.01)
*F01N 13/00* (2010.01)
*B01D 53/94* (2006.01)
*F01N 3/20* (2006.01)

(52) U.S. Cl.
CPC .......... *F01N 3/103* (2013.01); *F01N 3/2066* (2013.01); *F01N 13/009* (2014.06); *B01D 2251/208* (2013.01); *B01D 2251/2062* (2013.01); *B01D 2251/2067* (2013.01); *B01D 2257/404* (2013.01); *B01D 2257/702* (2013.01); *F01N 2550/02* (2013.01); *F01N 2590/08* (2013.01); *F01N 2610/03* (2013.01); *F01N 2900/1631* (2013.01); *Y02T 10/47* (2013.01)

(56) References Cited

OTHER PUBLICATIONS

International Search Report dated Nov. 4, 2014 corresponding International Application No. PCT/JP2014/074688.
International Preliminary Report on Patentability dated Mar. 22, 2016 in corresponding International Patent Application No. PCT/JP2014/074688.

* cited by examiner $$C_{act} = Q_{out} - Q_{in} + Q_{lost}$$

(a)

(b)

DIAGNOSTIC DEVICE FOR AN OXIDATION CATALYST

CROSS-REFERENCE TO RELATED APPLICATIONS

This application is a U.S. National Stage Application, which claims the benefit under 35 U.S.C. §371 of PCT International Patent Application No. PCT/JP2014/074688, filed Sep. 18, 2014, which claims the foreign priority benefit under 35 U.S.C. §119 of Japanese Patent Application No. 2013-193012, filed Sep. 18, 2013, the contents of which are incorporated herein by reference.

TECHNICAL FIELD

The present invention relates to a diagnostic device, and in particular to diagnosis of a deterioration of an oxidation catalyst arranged in an exhaust system of an internal combustion engine.

BACKGROUND ART

As an exhaust gas purifying catalyst to be arranged in an exhaust system (exhaust gas passage) of a diesel engine or the like, there is known an oxidation catalyst (Diesel Oxidation Catalyst: DOC) for oxidizing hydrocarbons (HC) and carbon monoxide (CO) contained in an exhaust gas and also oxidizing nitrogen monoxide (NO) to produce nitrogen dioxide ($NO_2$). There is also known a selective catalytic reduction (SCR) catalyst for selectively reducing and purifying nitrogen compounds (NOx) contained in the exhaust gas. The SCR catalyst uses ammonia ($NH_3$) as a reducing agent that is obtained by hydrolyzing urea solution (urea water).

In the SCR catalyst, the purification of NOx in a low temperature range is facilitated in particular when a ratio of NO contained in the exhaust gas to $NO_2$ produced in an upstream DOC becomes approximately 1 to 1. In other words, when the capability of the DOC to oxide NO ($NO_2$ producing capability of the DOC) drops due to aging deterioration or the like, the NOx purification rate of the SCR catalyst may be affected. In view of such possibility, there is a demand for diagnosing the deterioration state (level) of the DOC on board.

For example, Patent Literature Document 1 discloses a technique that estimates an amount of $NO_2$ by multiplying a ratio of $NO_2$ to NO contained in the exhaust gas by a detection value of the NOx sensor disposed downstream of the SCR catalyst, and determines whether the DOC is in a deteriorated state.

LISTING OF REFERENCES

Patent Literature Document 1: Japanese Patent Application Laid-Open Publication No. 2012-36860

It is difficult to directly detect a value of $NO_2$ contained in the exhaust gas with a sensor. Thus, the value of $NO_2$ may be estimated by multiplying a ratio of $NO_2$ by the detection value of the NOx sensor. This is the above-described conventional technique. However, the ratio of $NO_2$ to NO contained in the exhaust gas changes with the running condition. Thus, if the value of $NO_2$ is estimated from the detection value of the NOx sensor and the deterioration of the DOC is diagnosed, the diagnosis may not be performed at high accuracy.

SUMMARY OF THE INVENTION

An object of a diagnostic device disclosed herein is to carry out a deterioration diagnosis of the DOC at high accuracy.

A diagnostic device disclosed herein includes: an oxidation catalyst arranged in an exhaust system of an internal combustion engine and configured to oxidize at least hydrocarbons and nitrogen monoxide contained in an exhaust gas; a selective catalytic reduction catalyst arranged in the exhaust system at a position downstream of the oxidation catalyst and configured to reduce and purify NOx contained in the exhaust gas with ammonia being a reducing agent; a first purification rate calculation unit configured to calculate a low temperature NOx purification rate when a catalyst temperature of the selective catalytic reduction catalyst is in a predetermined low temperature range based on a NOx value at an upstream side and a NOx value at a downstream side of the selective catalytic reduction catalyst, and also configured to calculate a high temperature NOx purification rate when the catalyst temperature of the selective catalytic reduction catalyst is in a predetermined high temperature range based on the NOx value at the upstream side and the NOx value at the downstream side of the selective catalytic reduction catalyst; a second purification rate calculation unit configured to calculate a hydrocarbon purification rate of the oxidation catalyst based on at least a difference in exhaust gas heat quantity between an upstream side and a downstream side of the oxidation catalyst; and a determination unit configured to determine whether the oxidation catalyst is in a deteriorated state based on the calculated low temperature NOx purification rate, the calculated high temperature NOx purification rate, and the calculated hydrocarbon purification rate.

The diagnostic device disclosed herein is capable of performing a precise deterioration diagnosis of the DOC.

DETAILED DESCRIPTION

Figure 1:
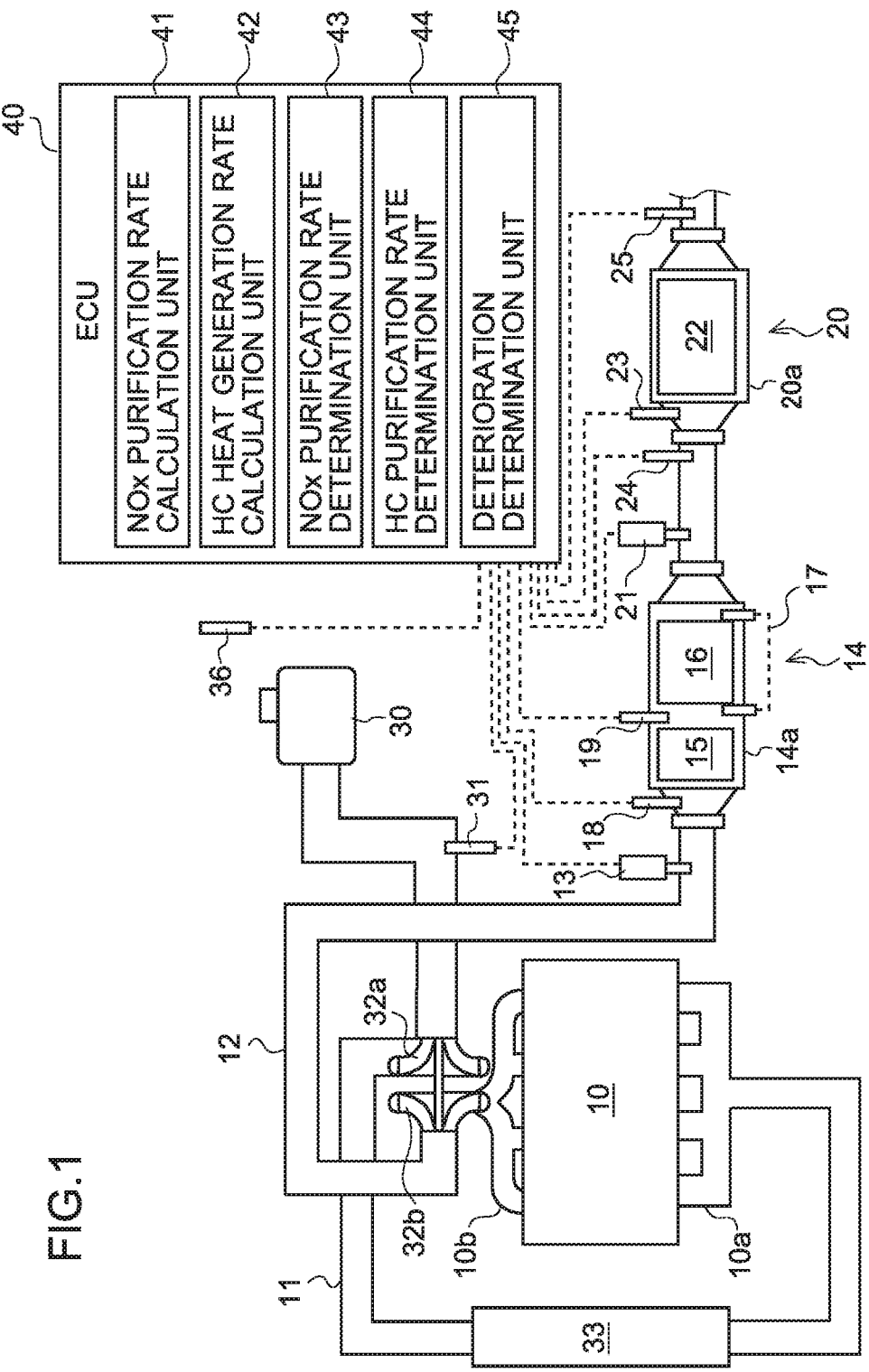
FIG. 1 is a schematic overall configuration diagram illustrating an intake and exhaust system of an engine to which a diagnostic device according to an embodiment of the present invention is applied.

Hereinafter, a diagnostic device according to an embodiment of the present invention will be described with reference to the accompanying drawings. Same parts are designated by same reference numerals, and such parts have same names and functions. Accordingly, redundant detailed descriptions of such parts will be omitted.

As shown in FIG. 1, a diesel engine (hereinafter simply referred to as "engine") 10 has an intake manifold 10a and an exhaust manifold 10b. An intake passage 11 for introducing fresh air is connected to the intake manifold 10a, and an exhaust passage 12 for discharging an exhaust gas to the atmosphere is connected to the exhaust manifold 10b.

On the intake passage 11, disposed are an air cleaner 30, an a mass air flow (MAF) sensor 31, a compressor 32a of a turbo charger, and an intercooler 33. The air cleaner 30, the MAF sensor 31, the compressor 32a and the intercooler 33 are arranged in this order from the upstream side. On the exhaust passage 12, disposed are a turbine 32b of the turbo charger, an upstream aftertreatment device 14, and a downstream aftertreatment device 20. The turbine 32b, the upstream aftertreatment device 14 and the downstream aftertreatment device 20 are arranged in this order from the upstream side. It should be noted that in FIG. 1 reference numeral 36 denotes an outside air temperature sensor.

The upstream aftertreatment device 14 includes a cylindrical catalyst casing 14a, a DOC 15, and a DPF 16. The DOC 15 is arranged upstream of the DPF 16 in the catalyst casing 14a. In addition, an in-pipe injector (injector for injecting a fuel into the exhaust pipe) 13 is arranged on an upstream side of the DOC 15, a DOC inlet temperature sensor 18 is arranged on the upstream side of the DOC 15, and a DOC outlet temperature sensor 19 is arranged on a downstream side of the DOC 15. A differential pressure sensor 17, which is used to detect (measure) a difference in pressure between the upstream and downstream sides of the DPF 16, is arranged across the DPF 16.

The in-pipe injector (exhaust pipe injector) 13 injects unburnt fuel (HC) into the exhaust passage 12 in accordance with an instruction signal received from an electronic control unit (hereinafter referred to as "ECU") 40. It should be noted that if post injections by way of multiple injections of the engine 10 are employed, the in-pipe injector 13 may be omitted.

The DOC 15 includes, for example, a ceramic support having a cordierite honeycomb structure or the like, and catalytic components supported on a surface of the ceramic support. Once unburnt HC is supplied to the DOC 15 by the in-pipe injector 13 or the post injection, the DOC 15 oxidizes HC to raise the temperature of the exhaust gas. In addition, the DOC 15 oxidizes NO in the exhaust gas to $NO_2$ to increase the ratio of $NO_2$ to NO in the exhaust gas.

The DPF 16 includes, for example, a large number of cells defined by porous partitions and arranged along the flow direction of the exhaust gas, with the upstream and downstream sides of the cells being plugged alternately. In the DPF 16, PM in the exhaust gas is collected in pores of the partitions and on surfaces of the partitions. When an amount of accumulated PM reaches a predetermined value, so-called forced regeneration is carried out, i.e., the accumulated PM is burnt for removal. The forced regeneration is carried out by supplying the unburnt fuel (HC) into the DOC 15 through the in-pipe injector 13 or the post injection, and raising the temperature of the exhaust gas flowing into the DPF 16 up to a PM combustion temperature (for example, about 600 degrees C.). The amount of accumulated PM can be obtained (known) from a sensor value of the differential pressure sensor 17.

The DOC inlet temperature sensor 18 detects the temperature of the upstream exhaust gas flowing into the DOC 15 (hereinafter referred to as "DOC inlet exhaust gas temperature"). The DOC outlet temperature sensor 19 detects the temperature of the downstream exhaust gas flowing out of the DOC 15 (hereinafter referred to as "DOC outlet exhaust gas temperature"). The detection values of the temperature sensors 18 and 19 are supplied to the ECU 40, which is electrically connected to the sensors 18 and 19.

The downstream aftertreatment device 20 includes a cylindrical catalyst casing 20a, a urea solution injector 21, and an SCR catalyst 22 disposed in the catalyst casing 20a. The urea solution injector 21 is arranged upstream of the SCR catalyst 22. An SCR catalyst inlet temperature sensor 23 and an SCR catalyst inlet NOx sensor 24 are disposed upstream of the SCR catalyst 22. An SCR catalyst outlet NOx sensor 25 is disposed downstream of the SCR catalyst 22.

The urea solution injector 21 injects a urea solution (urea water) from a urea solution tank (not shown) into the exhaust passage 12 between the upstream aftertreatment device 14 and the downstream aftertreatment device 20 in accordance with an instruction signal received from the ECU 40. The injected urea solution is hydrolyzed to $NH_3$ with the exhaust gas heat, and $NH_3$ is supplied to the SCR catalyst 22 on the downstream side as a reducing agent.

The SCR catalyst 22 includes, for example, a ceramic support having a honeycomb structure, and zeolite supported on a surface of the ceramic support. The SCR catalyst 22 absorbs $NH_3$, which supplied as the reducing agent, and the absorbed $NH_3$ reduces NOx contained in the exhaust gas passing therethrough for purification.

The SCR catalyst inlet temperature sensor 23 detects the temperature of the upstream exhaust gas that flows in the SCR catalyst 22 (hereinafter referred to as "SCR catalyst inlet exhaust gas temperature). The SCR catalyst inlet NOx sensor 24 detects the value of NOx contained in the exhaust gas that flows into the SCR catalyst 22. The SCR catalyst outlet NOx sensor 25 detects the value of NOx contained in the exhaust gas that flows out of the SCR catalyst 22. The detection values of these sensors 23 to 25 are supplied to the ECU 40, which is electrically connected to the sensors 23 to 25.

The ECU 40 performs various types of control, such as control over the engine 10, the in-pipe injector 13 and the urea solution injector 21, and includes a CPU, a ROM, a RAM, input ports, output ports, and other elements which are known in the art. In addition, the ECU 40 includes an NOx purification rate calculation unit 41, an HC heat generation rate calculation unit 42, an NOx purification rate determination unit 43, an HC purification rate determination unit 44, and a deterioration determination unit 45 as functional components thereof. It is assumed in the following description that all of these functional components are included in the ECU 40, which is a single piece of hardware, but one or more of these functional components may be included in a separate piece of hardware.

The NOx purification rate calculation unit 41 is an example of a first purification rate calculation unit of the present invention, and calculates a low temperature NOx purification rate $NC_{LOW\%}$ of the SCR catalyst 22 and a high temperature NOx purification rate $NC_{HIGH\%}$ of the SCR catalyst 22 on the basis of the expression (1). The low temperature NOx purification rate $NC_{LOW\%}$ is calculated when the exhaust gas temperature at the SCR catalyst inlet, which is obtained by the SCR catalyst inlet temperature sensor 23, is in a range of 180 to 280 degrees C. The high temperature NOx purification rate $NC_{HIGH\%}$ is calculated when the exhaust gas temperature at the SCR catalyst inlet, which is obtained by the SCR catalyst inlet temperature sensor 23, exceeds, for example, 280 degrees C.

$$NC_\% = \frac{\Sigma(NOx_{in} - NOx_{out})}{\Sigma NOx_{in}} \quad \text{[Formula 1]}$$

In the expression (1), $NOx_{in}$ represents a value of NOx contained in the exhaust gas that flows into the SCR catalyst 22, and is obtained from the SCR catalyst inlet NOx sensor 24. $NOx_{OUT}$ represents a value of NOx contained in the exhaust gas that flows out of the SCR catalyst 22, and is obtained from the SCR catalyst outlet NOx sensor 25.

The HC heat generation rate calculation unit 42 is an example of a second purification rate calculation unit according to the present invention, and calculates a heat generation rate (purification rate) of HC oxidized in the DOC 15 at the time of a forced regeneration in the DPF 16. A procedure of estimating the heat generation rate will be described in detail below.

Figure 2:
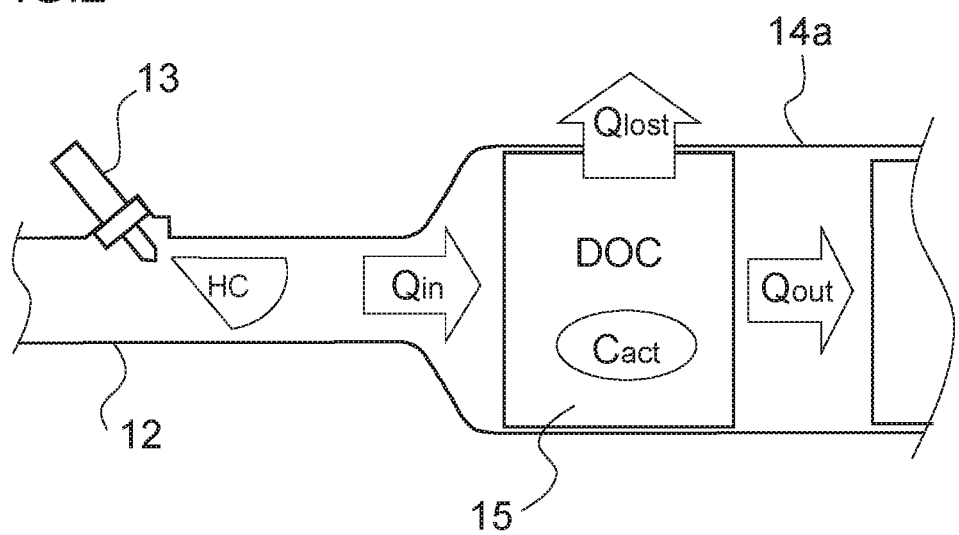
FIG. 2 is a schematic diagram useful to explain conservation of an energy generated upon oxidation of HC supplied to a DOC.

As shown in FIG. 2, an actual amount $C_{act}$ of heat generated by HC supplied from the in-pipe injector 13 into the DOC 15 at the time of the forced regeneration can be obtained by adding the amount $Q_{lost}$ of heat loss, i.e., a quantity of heat dissipated from the DOC 15 to the outside air, to an exhaust gas energy difference $\Delta Q$, which is a difference between an energy $Q_{in}$ of the exhaust gas on the upstream side of the DOC 15 and an energy $Q_{out}$ of the exhaust gas on the downstream side of the DOC 15.

The energy $Q_{in}$ of the upstream exhaust gas is calculated on the basis of the expression (2), and the energy $Q_{out}$ of the downstream exhaust gas is calculated on the basis of the expression (3).

$$Q_{in} = c_{exh} \cdot m_{exh} \cdot T_{DOC\_in} \quad \text{[Formula 2]}$$

$$Q_{out} = c_{exh} \cdot m_{exh} \cdot T_{DOC\_out} \quad \text{[Formula 3]}$$

In the expression (2) and (3), $c_{exh}$ represents specific heat of the exhaust gas, and $m_{exh}$ represents the flow rate of the exhaust gas, which is obtained from a detection value of the MAF sensor 31, the amount of fuel injection of the engine 10, and so on. It should be noted that the flow rate $m_{exh}$ of the exhaust gas may be obtained directly from an exhaust gas flow rate sensor (not shown) or the like. $T_{DOC\_in}$ represents the exhaust gas temperature at an inlet of the DOC 15, and is obtained by the DOC inlet temperature sensor 18. $T_{DOC\_out}$ represents the exhaust gas temperature at an outlet of the DOC 15, and is obtained by the DOC outlet temperature sensor 19.

It can be assumed that the amount $Q_{lost}$ of heat loss be a sum of an amount $Q_{natural}$ of heat loss caused by natural convection and an amount $Q_{forced}$ of heat loss caused by forced convection ($Q_{lost} = Q_{natural} + Q_{forced}$).

The amount $Q_{natural}$ of heat loss caused by the natural convection is calculated on the basis of the expression (4).

$$Q_{natural} = h_n \cdot A_s \cdot (T_{DOC\_brick} - T_{ambient}) \quad \text{[Formula 4]}$$

In the expression (4), $A_s$ represents an effective area of an outer circumferential surface of the DOC 15 (or an outer circumferential surface of that portion of the catalyst casing 14a in which the DOC 15 is arranged). $T_{DOC\_brick}$ represents the inside temperature of the DOC 15, and is calculated as the average of the DOC inlet exhaust gas temperature $T_{DOC\_in}$ and the DOC outlet exhaust gas temperature $T_{DOC\_out}$. $T_{ambient}$ represents the temperature of the ambient air, and is obtained by the outside air temperature sensor 36. $h_n$ represents a heat transfer coefficient of natural convection, and is given by the expression (5).

$$h_n = \frac{Nu_n \cdot k}{L_n} \quad \text{[Formula 5]}$$

In the expression (5), k represents the thermal conductivity of the air. $L_n$ represents a characteristic length of the DOC 15, and is determined appropriately in accordance with, for example, the volume of the DOC 15. $Nu_n$ represents a Nusselt number for natural convection.

Usually, the DOC 15 has a column shape, and the catalyst casing 14a, in which the DOC 15 is received, has a substantially cylindrical shape. Therefore, the oxidation heat generated in the DOC 15 is presumably dissipated to the outside air through the entire cylindrical outer circumferential surfaces of the DOC 15 and the catalyst casing 14a. Assuming that heat dissipation by natural convection causes heat to transfer through the entire cylindrical outer circumferential surface with an axis of the cylindrical outer circumferential surface being horizontally oriented, the Nusselt number $Nu_n$ is given by the expression (6), where Gr represents the Grashof number, and Pr represents the Prandtl number.

$$Nu_n = 0.53 \times (Gr \cdot Pr)^{0.25} \quad \text{[Formula 6]}$$

The amount $Q_{forced}$ of heat loss caused by the forced convection is calculated on the basis of the expression (7).

$$Q_{forced} = h_f \cdot A_f \cdot (T_{doc\_brick} - T_{ambient}) \quad \text{[Formula 7]}$$

In the expression (7), $A_f$ represents the effective area of the outer circumferential surface of the DOC 15 (or the outer circumferential surface of that portion of the catalyst casing 14a in which the DOC 15 is arranged). $T_{DOC\_brick}$ represents the inside temperature of the DOC 15, and is calculated as the average of the DOC inlet exhaust gas temperature $T_{DOC\_in}$ and the DOC outlet exhaust gas temperature $T_{DOC\_out}$. $T_{ambient}$ represents the temperature of the outside air, and is obtained by the outside air temperature sensor 36. $h_f$ represents a heat transfer coefficient of the forced convection, and is given by the expression (8).

$$h_f = \frac{Nu_f \cdot k}{L_f} \quad \text{[Formula 8]}$$

In the expression (8), $L_f$ represents the characteristic length of the DOC 15, and is determined appropriately in accordance with, for example, the volume of the DOC 15. $Nu_f$ represents a Nusselt number of the forced convection.

Figure 3:
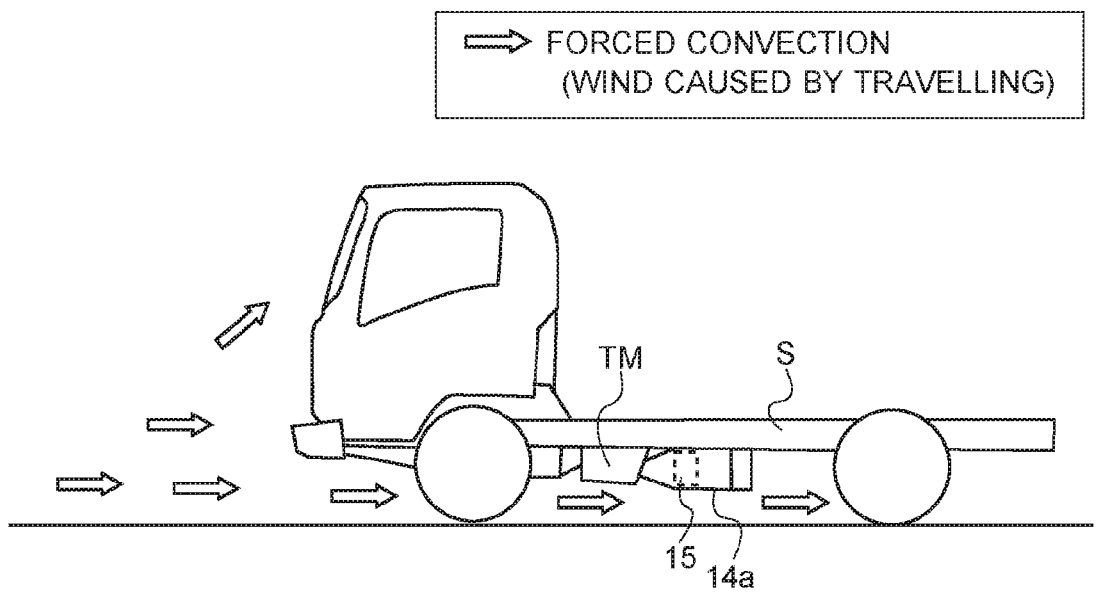
FIG. 3 is a schematic side view useful to explain a heat loss from the DOC due to an influence of forced convection.

As illustrated in FIG. 3, the catalyst casing 14a that receives the DOC 15 therein is typically fixed to a lower portion of a chassis frame S of a vehicle body, and a transmission TM and other elements are arranged in front of the catalyst casing 14a. Accordingly, a wind which flows from in front of the vehicle body into a space below the vehicle body while the vehicle is travelling can be assumed to be a planar turbulent flow which influences only a lower surface of the DOC 15 (or of the catalyst casing 14a). Therefore, the Nusselt number $Nu_f$ of the forced convection is given by the expression (9), which is derived by solving a heat transfer equation for planar turbulence.

$$Nu_f = 0.037 \times Re^{0.8} \times Pr^{0.33} \quad \text{[Formula 9]}$$

In the expression (9), Re represents the Reynolds number. The Reynolds number Re is given by the expression (10), where v represents the average velocity of the air, ρ represents the air density, L represents the characteristic length of the DOC 15, and μ represents a dynamic viscosity coefficient.

$$Re = \frac{v \cdot \rho \cdot L}{\mu} \quad \text{[Formula 10]}$$

The HC heat generation rate calculation unit 42 adds the amount $Q_{lost}$ of heat loss, which is calculated on the basis of the expressions (4) to (10), to the exhaust gas energy difference ΔQ between the energy $Q_{in}$ of the exhaust gas on the upstream side, which is calculated on the basis of the expression (2), and the energy $Q_{out}$ of the exhaust gas on the downstream side, which is calculated on the basis of the expression (3), to calculate the actual amount $C_{act}$ of heat generated by HC in the DOC 15 at the time of the forced regeneration. The HC heat generation rate calculation unit 41 then divides the actual amount $C_{act}$ of heat generated by HC by a theoretical amount $C_{theo}$ of heat generated by an in-pipe injection (or a post injection) to calculate an actual HC heat generation rate $C_{ACT\%}$ in the DOC 15.

The NOx purification rate determination unit 43 is an example of a determination unit of the present invention, and determines the decrease (deterioration) in the NOx purification rate in the SCR catalyst 22 on the basis of the low temperature NOx purification rate $NC_{LOW\%}$ and the high temperature NOx purification rate $NC_{HIGH\%}$, which are calculated by the NOx purification rate calculation unit 41. More specifically, the ECU 40 stores the NOx purification rate threshold values $NC_{STD\%}$, which are purification rates of NO and $NO_2$ contained in the exhaust gas flowing into the SCR catalyst 22 when the DOC 15 operations in a normal state (e.g., the solid line in FIG. 4). The threshold values are prepared in advance by experiments or the like. The NOx purification rate determination unit 43 determines that the low temperature NO purification rate has deteriorated when the difference $\Delta NC_{LOW\%}$ between the low temperature NOx purification rate $NC_{LOW\%}$ and the NOx purification rate threshold value $NC_{STD\%}$ reaches a predetermined upper threshold value $\Delta NC_{MAX}$, and determines that the high temperature NO purification rate has deteriorated when the difference $\Delta NC_{HIGH\%}$ between the high temperature NOx purification rate $NC_{HIGH\%}$ and the NOx purification rate threshold value $NC_{STD\%}$ reaches the predetermined upper threshold value $\Delta NC_{MAX}$.

The HC purification rate determination unit 44 is an example of the determination unit of the present invention, and determines the decrease (deterioration) in the HC purification rate in the DOC 15 on the basis of the actual HC heat generation rate $C_{ACT\%}$, which is calculated by the HC heat generation rate calculation unit 42. Specifically, the ECU 40 stores the HC heat generation rate threshold values $C_{STD\%}$ that indicate the HC heat generation rate when a specified amount of HC is substantially completely oxidized in the DOC 15. The threshold values $C_{STD\%}$ are prepared in advance by experiments or the like. The HC purification rate determination unit 44 determines that the HC purification rate of the DOC 22 has deteriorated when the difference $\Delta C_{\%}$ between the actual HC heat generation rate $C_{ACT\%}$ and the HC heat generation rate threshold value $C_{STD\%}$ reaches a predetermined upper threshold value $\Delta C_{MAX}$.

The deterioration determination unit 45 is an example of the determination unit of the present invention, and determines the deterioration of the $NO_2$ producing capability of the DOC 15 on the basis of the determination result of the NOx purification rate, which is determined by the NOx purification rate determination unit 43, and the determination result of the HC purification rate, which is determined by the HC purification rate determination unit 44. The procedure for the deterioration determination will be described in detail below.

Figure 4:
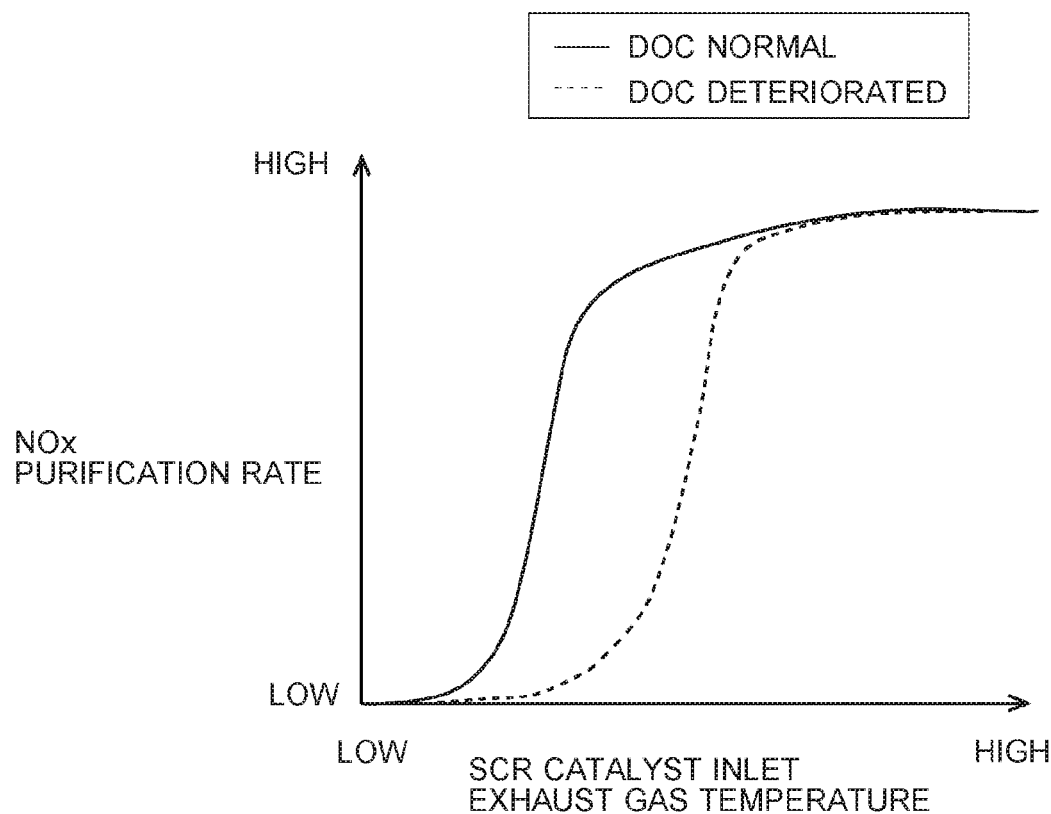
FIG. 4 shows a comparison of an NOx purification rate of an SCR catalyst between when the upstream DOC is in a normal state and when the upstream DOC is in a deteriorated state.

In general, when the NO oxidation capability ($NO_2$ producing capability) of the DOC 15, which is located upstream of the SCR catalyst 22, drops, the NOx purification capability of the SCR catalyst 22 drops in particular in the low temperature range (e.g., 180 to 280 degrees C.), as shown in FIG. 4. On the other hand, there is a tendency that the capability of purifying NOx does not drop in a high temperature range (e.g., 280 degrees C. or higher). In other words, even if the low temperature NOx purification rate $NC_{LOW\%}$ drops, it is assumed that the SCR catalyst 22 is in the normal state as long as the high temperature NOx purification rate $NC_{HIGH\%}$ does not drop. Then it is assumed that the $NO_2$ producing capability of the DOC 15 has dropped.

Figure 5:
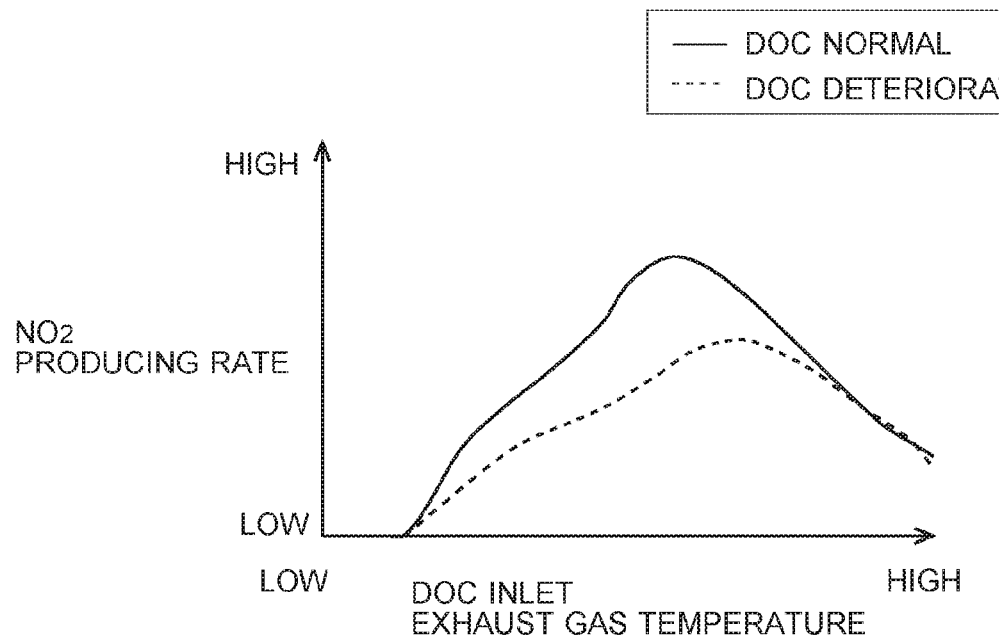
FIG. 5(a) shows a comparison of an NO oxidization capability ($NO_2$ producing capability) of the DOC between when the DOC is in the normal state and when the DOC is in the deteriorated state.
FIG. 5(b) shows a comparison of an HC oxidization capability (HC purification capability) of the DOC between when the DOC is in the normal state and when the DOC is in the deteriorated state.
Figure 5:
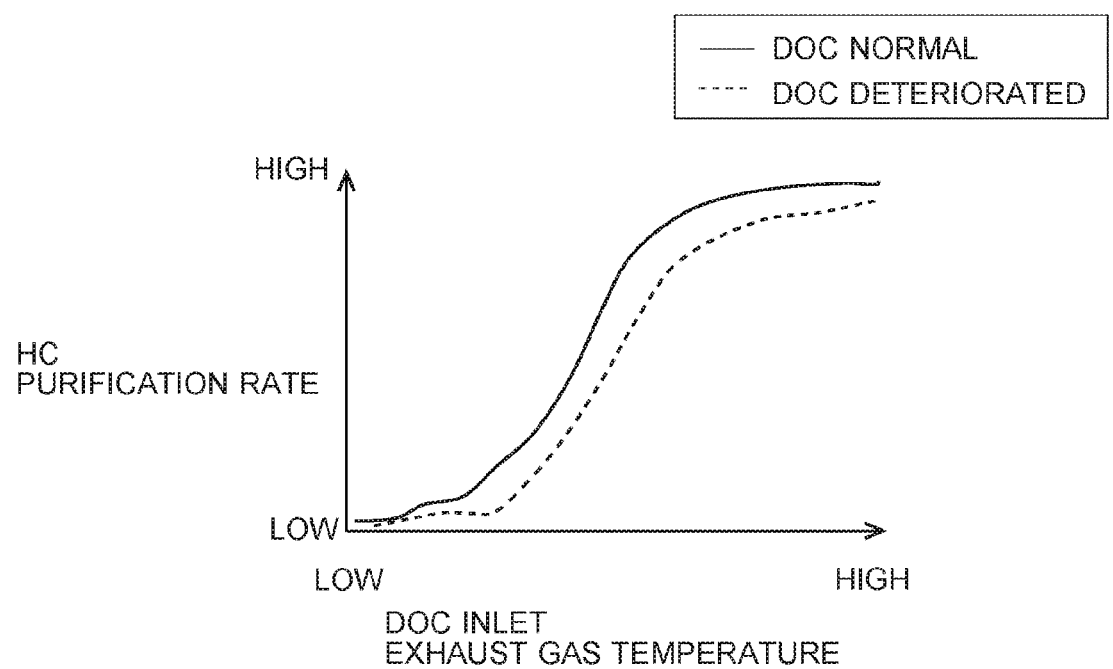

In general, when the $NO_2$ producing capability of the DOC 15 drops as shown in FIG. 5(a), there is a tendency that the HC oxidization capability (HC purification rate) drops correspondingly as shown in FIG. 5(b). In other words, when the actual HC heat generation rate $C_{ACT\%}$ drops due to the deterioration of the DOC 15, it is assumed that the $NO_2$ producing capability drops correspondingly.

The deterioration determination unit 45 determines that the $NO_2$ producing capability of the DOC 15 has deteriorated when the following three conditions are met, i.e., the low temperature NOx purification rate $NC_{LOW\%}$ has dropped (Condition 1), the high temperature NOx purification rate $NC_{HIGH\%}$ does not drop (Condition 2), and the HC purification rate (actual HC heat generation rate $C_{ACT\%}$) has dropped (Condition 3).

Figure 6:
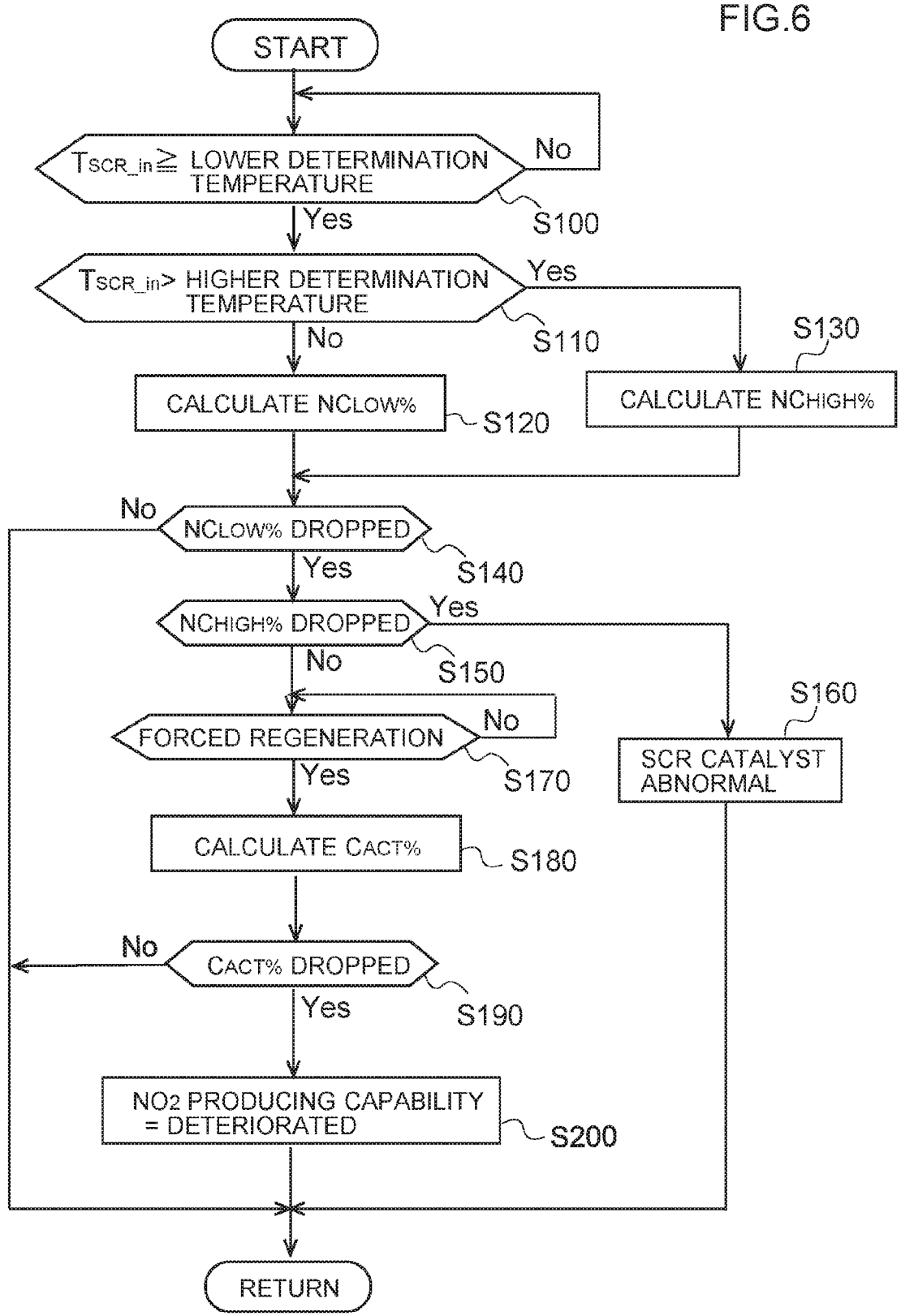
FIG. 6 is a flowchart illustrating control performed by the diagnostic device according to this embodiment.

Next, a control flow of the diagnostic device according to this embodiment will be described with reference to FIG. 6.

In Step (hereinafter, Step is simply referred to as "S") 100, it is determined whether or not the SCR catalyst inlet exhaust gas temperature $T_{SCR\_in}$, which is obtained by the SCR catalyst inlet temperature sensor 23, has reached a lower determination temperature (e.g., 180 degrees C.). In S110, it is determined whether or not the SCR catalyst inlet exhaust gas temperature $T_{SCR\_in}$ has exceeded a higher determination temperature (e.g., 280 degrees C.).

If the determination in S110 is "No," the SCR catalyst inlet exhaust gas temperature $T_{SCR\_in}$ is between the lower determination temperature and the higher determination temperature (e.g., between 180 degrees C. and 280 degrees C.). Then, the control proceeds to S120, and the low temperature NOx purification rate $NC_{LOW\%}$ is calculated. On the other hand, if the determination in S110 is "Yes," the SCR catalyst inlet exhaust gas temperature $T_{SCR\_in}$ is higher than 280 degrees C. Then, the control proceeds to S130, and the high temperature NOx purification rate $NC_{HIGH\%}$ is calculated.

In S140, it is determined whether or not the low temperature NOx purification rate $NC_{LOW\%}$ of the SCR catalyst 22 has dropped. If the determination is "No," it is assumed that both of the DOC 15 and the SCR catalyst 22 are in the normal state. Then, the control proceeds to "RETURN."

In S150, it is determined whether or not the high temperature NOx purification rate $NC_{HIGH\%}$ of the SCR catalyst 22 has dropped. If the determination is "Yes" (if both of the low temperature purification rate and the high temperature purification rate have dropped), it is assumed that the SCR catalyst 22 is in the deteriorated state and/or other faults have occurred. Then, it is determined in S160 that the SCR catalyst 22 is in the deteriorated state, and the control proceeds to "RETURN." On the other hand, if the determination is "No," the low temperature NOx purification rate $NC_{LOW\%}$ has only dropped. Then, it is assumed that the SCR catalyst 22 is in the normal state, and the control proceeds to S170 to determine the deterioration level of the DOC 15.

In S170, it is determined whether or not the forced regeneration has been carried out to the DPF 16. If the forced regeneration has been carried out (Yes), the control proceeds to S180.

In S180, the actual HC heat generation rate $C_{ACT\%}$ (HC purification rate) of the DOC 15 is calculated. In S190, it is determined whether or not the HC purification rate has dropped. When the determination is "No," the cause thereof may be other than the deterioration of the DOC 15. Thus, the control proceeds to "RETURN." On the other hand, when the determination in S190 is "Yes," the three conditions are met, namely, the low temperature NOx purification rate $NC_{LOW\%}$ has dropped (Condition 1) (S140), the high temperature NOx purification rate $NC_{HIGH\%}$ is in the normal range (Condition 2) (S150), and the actual HC heat generation rate $C_{ACT\%}$ has dropped (Condition 3) (S190). In other words, it is assumed that the SCR catalyst 22 is in the normal state, and the $NO_2$ producing capability of the DOC 15 has dropped along with the fact that the HC purification capability of the DOC 15 has deteriorated. The control proceeds to S200, and it is determined that the $NO_2$ producing capability of the DOC 15 has deteriorated. Then, the control proceeds to "RETURN."

Next, beneficial effects of the diagnostic device according to this embodiment will be described below.

Conventionally, it is difficult to directly detect the value (amount) of $NO_2$ contained in the exhaust gas with the sensor. Thus, the $NO_2$ producing capability of the DOC is diagnosed on the basis of the estimated value or the like, which is obtained by multiplying the $NO_2$ ratio of the exhaust gas by the detection value of the NOx sensor or the like. However, the ratio of NO to $NO_2$ in the exhaust gas changes with the running condition of the engine or the like. Thus, when the value of $NO_2$ is estimated from the detection value of the NOx sensor, there is a possibility that the deterioration of the DOC may not be diagnosed accurately.

On the contrary, the diagnostic device of this embodiment does not estimate the value of $NO_2$ contained in the exhaust gas that flows through the DOC 15. Rather, the diagnostic device is configured to diagnose the $NO_2$ producing capability of the DOC 15 on the basis of the three conditions, namely the low temperature NOx purification rate $NC_{LOW\%}$ (Condition 1), the high temperature NOx purification rate $NC_{HIGH\%}$ (Condition 2), and the actual HC heat generation rate $C_{ACT\%}$ (Condition 3).

Therefore, the diagnostic device of this embodiment can precisely diagnose the $NO_2$ producing capability of the DOC 15 without being influenced by the change in the running condition and the like.

The diagnostic device of this embodiment is configured to determine the HC purification rate of the DOC 15 on the basis of an actual amount $C_{act}$ of HC heat generation, which is obtained by adding up the heat loss $Q_{lost}$ released to the ambient air to the exhaust gas energy difference $\Delta Q$ between the upstream side and the downstream side of the DOC 15.

Consequently, the diagnostic device according to this embodiment can precisely calculate an actual amount $C_{act}$ of HC heat generation while taking the heat loss $Q_{lost}$ to the outside into consideration. It is therefore possible to effectively improve the determination accuracy of the HC purification rate deterioration as compared to the determination that is made on the basis of only the exhaust gas energy difference $\Delta Q$.

It should be noted that the present invention is not limited to the above-described embodiment, and that changes and modifications can be made as appropriate without departing from the scope and spirit of the present invention.

Figure 7:
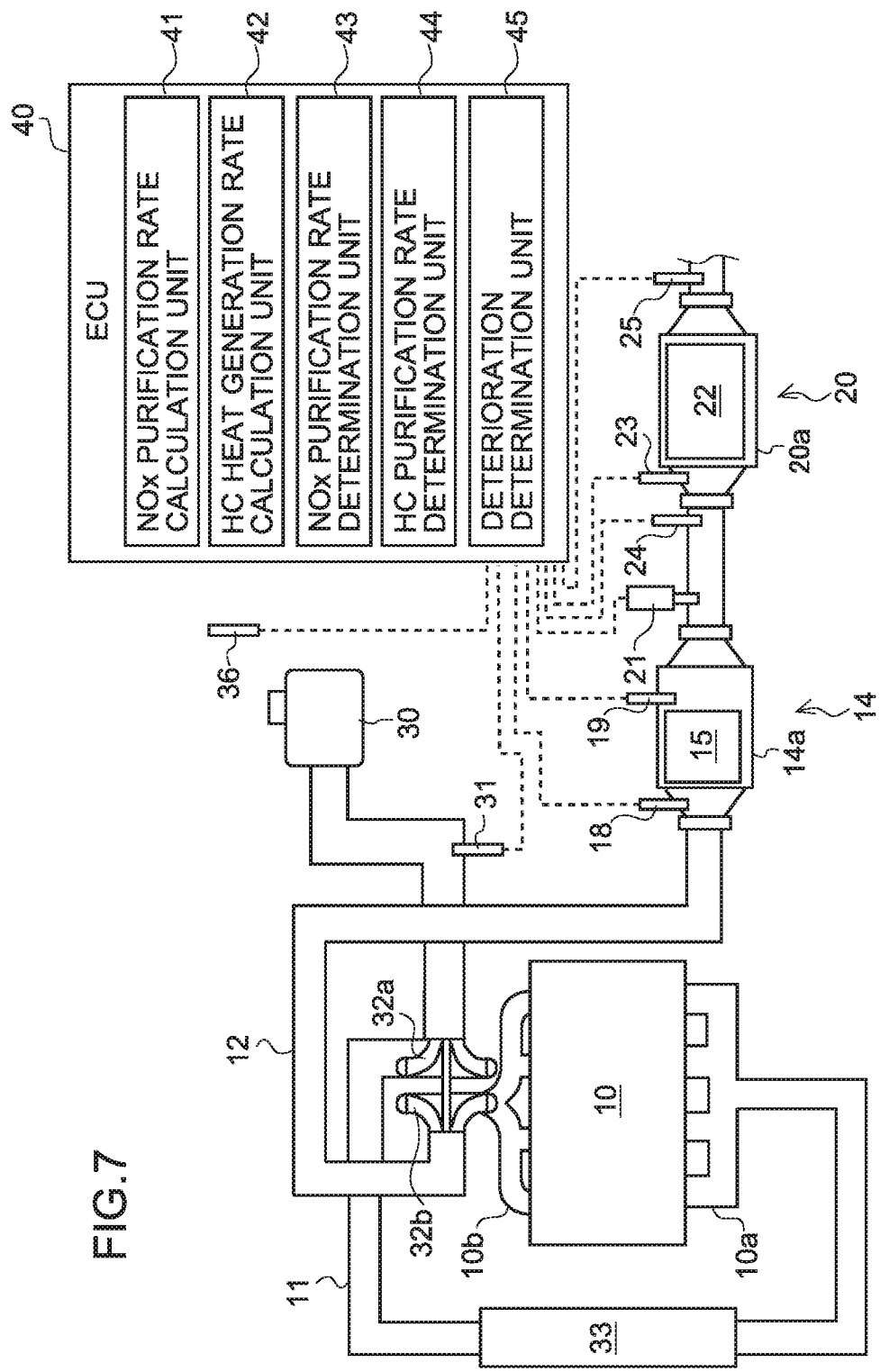
FIG. 7 is a schematic overall configuration diagram illustrating an intake and exhaust system of an engine to which a diagnostic device according to another embodiment of the present invention is applied.

For example, the present invention may be applied to a device as illustrated in FIG. 7 in which the upstream aftertreatment device 14 includes only the DOC 15, and neither the DPF 16 nor the in-pipe injector 13 is provided. In this configuration, S170 (forced regeneration of the DPF) in the flowchart of FIG. 6 is omitted, and the post injection by the engine 10, for example, is performed. In addition, the engine 10 is not limited to the diesel engine, and the present invention can be widely applied to other internal combustion engines, such as, for example, gasoline engines.

The invention claimed is:

1. A diagnostic device comprising:
an oxidation catalyst arranged in an exhaust system of an internal combustion engine and configured to oxidize at least hydrocarbons and nitrogen monoxide contained in an exhaust gas;
a selective catalytic reduction catalyst arranged in the exhaust system at a position downstream of the oxidation catalyst and configured to reduce and purify NOx contained in the exhaust gas with ammonia being a reducing agent;
a first purification rate calculation unit configured to calculate a low temperature NOx purification rate when a catalyst temperature of the selective catalytic reduction catalyst is in a predetermined low temperature range based on a NOx value at an upstream side and a NOx value at a downstream side of the selective catalytic reduction catalyst, and calculate a high temperature NOx purification rate when the catalyst temperature of the selective catalytic reduction catalyst is in a predetermined high temperature range based on the NOx value at the upstream side and the NOx value at the downstream side of the selective catalytic reduction catalyst;
a second purification rate calculation unit configured to calculate a hydrocarbon purification rate of the oxidation catalyst based on at least a difference in exhaust gas heat quantity between an upstream side and a downstream side of the oxidation catalyst; and
a determination unit configured to determine whether the oxidation catalyst is in a deteriorated state based on the calculated low temperature NOx purification rate, the calculated high temperature NOx purification rate, and the calculated hydrocarbon purification rate.

2. The diagnostic device according to claim 1, wherein the second purification rate calculation unit calculates the hydrocarbon purification rate based on a hydrocarbon heat generation quantity, which is obtained by adding a quantity of heat loss, which is dissipated to an ambient air from the oxidation catalyst, to a difference in an exhaust gas heat quantity between an upstream side and a downstream side of the oxidation catalyst.

3. The diagnostic device according to claim 2, wherein the second purification rate calculation unit calculates the quantity of heat loss based on a first model formula including a heat transfer coefficient of natural convection and a second model formula including a heat transfer coefficient of forced convection.

4. The diagnostic device according to claim 3, wherein the oxidation catalyst is received in a cylindrical catalyst casing arranged at a lower portion of a vehicle body; and the heat transfer coefficient of the forced convection is set based on a Nusselt number assuming that forced convection causes a planar turbulent flow that influences a lower surface of the catalyst casing.

5. The diagnostic device according to claim 1, wherein the determination unit determines that a capability of the oxidation catalyst to generate nitrogen dioxide is in a deteriorated state when the low temperature NOx purification rate drops, the high temperature NOx purification rate is normal, and the hydrocarbon purification rate drops.

6. The diagnostic device according to claim 5, wherein the second purification rate calculation unit calculates the hydrocarbon purification rate based on a hydrocarbon heat generation quantity, which is obtained by adding a quantity of heat loss, which is dissipated to an ambient air from the oxidation catalyst, to a difference in an exhaust gas heat quantity between an upstream side and a downstream side of the oxidation catalyst.

7. The diagnostic device according to claim 6, wherein the second purification rate calculation unit calculates the quantity of heat loss based on a first model formula including a heat transfer coefficient of natural convection and a second model formula including a heat transfer coefficient of forced convection.

8. The diagnostic device according to claim 7, wherein the oxidation catalyst is received in a cylindrical catalyst casing arranged at a lower portion of a vehicle body; and the heat transfer coefficient of the forced convection is set based on a Nusselt number assuming that forced convection causes a planar turbulent flow that influences a lower surface of the catalyst casing.

9. The diagnostic device according to claim 1, wherein the internal combustion engine is a diesel engine.

10. The diagnostic device according to claim 9, wherein the oxidation catalyst is a diesel oxidation catalyst.

\* \* \* \* \*